(12) United States Patent
Chang et al.

(10) Patent No.: US 7,496,253 B2
(45) Date of Patent: Feb. 24, 2009

(54) WIDE PASSBAND OPTICAL INTERLEAVER

(75) Inventors: Shih-Jung Chang, Taipei (TW); Yin-Chieh Huang, Taipei County (TW); Chi-Yu Ni, Taipei (TW); Yung-Jui Chen, Ellicott City, MD (US)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/567,743

(22) Filed: Dec. 7, 2006

(65) Prior Publication Data

US 2008/0138014 A1    Jun. 12, 2008

(51) Int. Cl.
G02B 6/28    (2006.01)

(52) U.S. Cl. .................................. 385/24; 385/27

(58) Field of Classification Search ................ None
See application file for complete search history.

(56) References Cited

U.S. PATENT DOCUMENTS

| | | |
|---|---|---|
| 6,834,141 B1 | 12/2004 | Sidick |
| 6,907,156 B1 * | 6/2005 | Madsen ................ 385/24 |
| 6,928,209 B2 | 8/2005 | Su et al. |
| 2003/0231826 A1 * | 12/2003 | Boyd et al. ............ 385/27 |
| 2005/0271323 A1 * | 12/2005 | Zhang et al. ........... 385/27 |

FOREIGN PATENT DOCUMENTS

WO    0118598    3/2001

* cited by examiner

*Primary Examiner*—Sung H Pak
*Assistant Examiner*—Chad H Smith
(74) *Attorney, Agent, or Firm*—Jianq Chyun IP Office

(57) ABSTRACT

A wide passband optical interleaver includes a first optical splitter, having a first output terminal and a second output terminal. A first optical route is coupled to the first output terminal. A second optical route is coupled to the second output terminal. A delay is coupled on the second optical route. A second optical splitter having two input terminals is receiving the first optical route and the second optical route. A plurality of optical filter respectively having transmission coefficients $\rho_i$ is coupled to the first optical route and the second optical route. The transmission coefficients $\rho_i$ are determined by satisfying a desired quantity of effective group delay ratio T, defined as $$T = \sum_i S_i \frac{1-\rho_i}{1+\rho_i}, \text{ where } S_i \text{ is } +1 \text{ or } -1.$$

where $S_i$ is +1 or −1.

10 Claims, 3 Drawing Sheets

WIDE PASSBAND OPTICAL INTERLEAVER

BACKGROUND OF THE INVENTION

1. Field of Invention

The present invention relates to optical interleaver. More particularly, the present invention relates to a wide passband interleaver.

2. Description of Related Art

The optical channel interleaver has been widely applied in a system or apparatus of Dense Wavelength-Division Multiplexing (DWDM), in which the DWDM technology is one of the best solutions to transmit a large amount of data. The interleaver and its application is shown in FIG. 1. In FIG. 1, the interleaver 100 receives a sequence of optical signals at the operation wavelengths, such as $\lambda_1, \lambda_2, \lambda_3, \ldots \lambda_{79}, \lambda_{80}$. The interleaver 100, for example, divides the 80 signals into an odd group of $\lambda_1, \lambda_3, \ldots \lambda_{79}$ and an even group $\lambda_2, \lambda_4, \ldots \lambda_{80}$. The signals of the odd group are output from one terminal while the signals of the even group are output from another terminal, in sequence. Basically, the signals of odd group are complementary to the signals of even group. In actual application, the signals of the odd group $\lambda_1, \lambda_3, \ldots \lambda_{79}$ are input to a DWDM 102, so as to convert the sequence signals into parallel signals in 40 channels. Likewise, the signals of the even group $\lambda_2, \lambda_4, \ldots \lambda_{80}$ are input to another DWDM 102, so as to convert the sequence signals into parallel signals in another 40 channels. Therefore, 80 channels of input signals can be converted into 80 parallel channels while the DWDM 102 may only operated in 40 channels.

The convention interleaver is usually formed by arrayed waveguide gratings (AWG), thin-film filter, or multi-lattice MZI (Mach-Zehnder Interferometer). For an interleaver by any manner, the concerned issue is how to design a good interleaver with an effective use on the bandwidth within each channel.

FIG. 2 is a drawing, schematically illustrating a conventional interleaver. In FIG. 2, the conventional interleaver includes MZI element and a ring resonant filter 126, coupled with the MZI element. The MZI element includes two direct optical couplers 120 and 128 and two optical routes 122 and 124 between the two direct optical couplers 120 and 128. The ring resonant filter 126 is coupled to the optical route 124. The sequence signals are input from the input terminal (Input). Due to effect of the ring resonant filter 126 with coupler 128, the signal responses at the terminals S1 and S2 are different in frequency. As a result, an interleaver can be achieved. However, the effective bandwidth ratio for the passband is just about 43% at 30 dB crosstalk operation in simulation.

In an ideal condition for operation, a perfect frequency spectrum property of the interleaver is that the signal is "1" for the passband and the signal is "0" for the stopband. After the optical signal passes this kind of filter for several times, precision of the signal can still remain. However, the usual filter is not in a perfect condition. Taking the usual one of Gauss-type filter as the example, after the optical signal passes this filter for several times, the frequency band becomes narrow, resulting in reducing on the bandwidth within the channel. When the frequency band of the optical signal in a single wavelength becomes narrow, the system needs to be designed with high precision, or the optical signal is very easily operated at the range of stopband of the filter, resulting in signal error. In order to meet the great amount of data transmission, each kind of data transmission system needs a specific design for the devices being used. This also causes the high fabrication cost.

For at least the above issues, it is strongly needed to design an interleaver with wide passband and even frequency spectrum property for practical use in optical data transmission system.

SUMMARY OF THE INVENTION

The present invention provides an optical interleaver with wide passband. The effective bandwidth ratio for the passband can be greatly improved.

The present invention provides a wide passband optical interleaver, comprising a first optical splitter, having a first output terminal and a second output terminal. A first optical route is coupled to the first output terminal. A first optical filter having a transmission coefficient $\rho_1$ is coupled on the first optical route. A second optical route is coupled to the second output terminal. A second optical filter having a transmission coefficient $\rho_2$ and a delay are coupled on the second optical route. A second optical splitter has two input terminals for receiving the first optical route and the second optical route. The transmission coefficients $\rho_1$ and $\rho_2$ are determined by satisfying a desired quantity of effective group delay ratio T, defined as $$T = \frac{1-\rho_1}{1+\rho_1} - \frac{1-\rho_2}{1+\rho_2}.$$

A wide passband optical interleaver includes a first optical splitter, having a first output terminal and a second output terminal. A first optical route is coupled to the first output terminal. A second optical route is coupled to the second output terminal. A delay is coupled on the second optical route. A second optical splitter having two input terminals is receiving the first optical route and the second optical route. A plurality of optical filter respectively having transmission coefficients $\rho_i$ is coupled to the first optical route and the second optical route. The transmission coefficients $\rho_i$ are determined by satisfying a desired quantity of effective group delay ratio T, defined as $$T = \sum_i S_i \frac{1-\rho_i}{1+\rho_i},$$

where $S_i$ is +1 or −1, and i is integer larger than or equal to 2.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the invention, the interleaver of the present invention can have wide passband, so that the signal error can be effectively reduced. Several embodiments are provided for descriptions but the present invention is not only limited to the embodiments.

Figure 1:
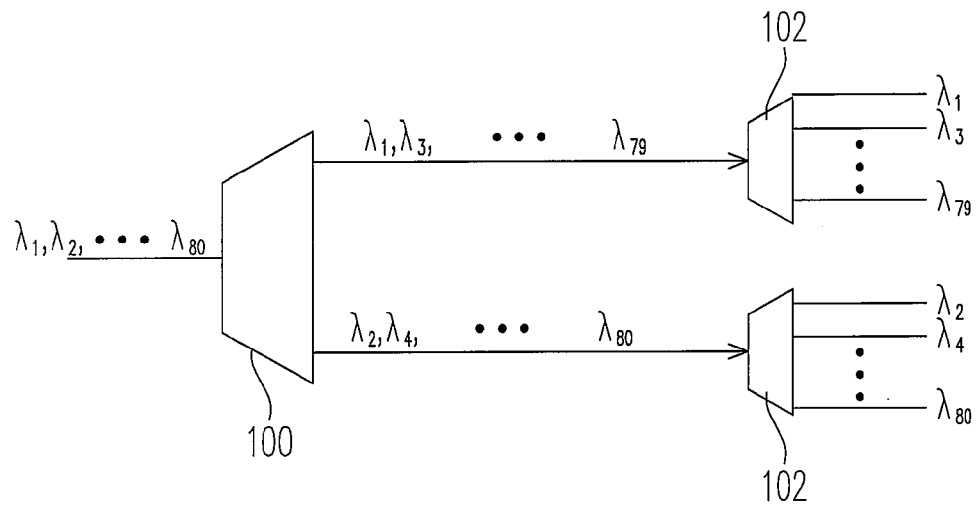
FIG. 1 is a drawing, schematically illustrating a conventional interleaver with application.
Figure 2:
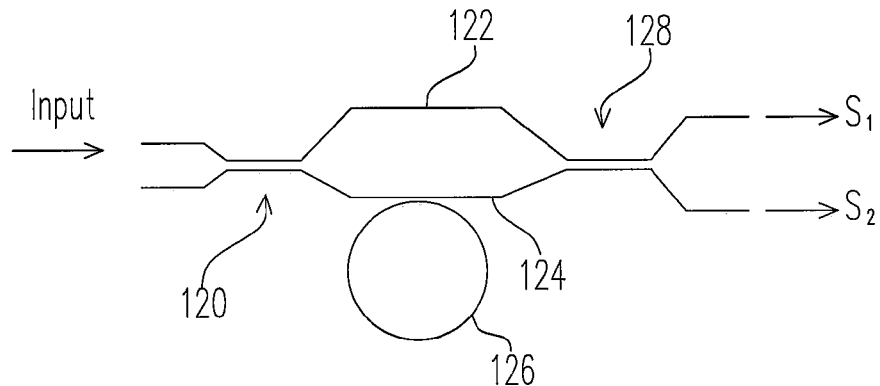
FIG. 2 is a drawing, schematically illustrating a conventional interleaver.
Figure 3:
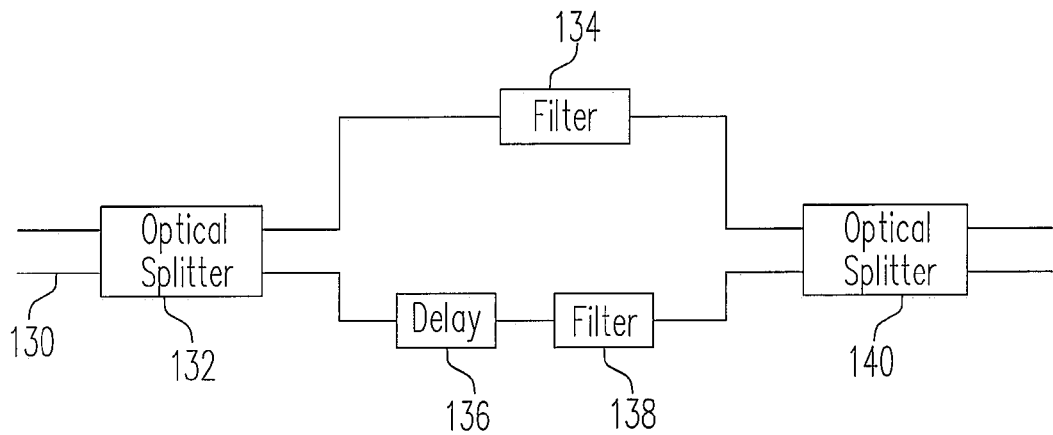
FIG. 3 is a drawing, schematically illustrating a functional structure of a wide passband interleaver, according to an embodiment of the present invention.

FIG. 3 is a drawing, schematically illustrating a functional structure of a wide passband interleaver, according to an embodiment of the present invention. In FIG. 3, the interleaver includes a MZI basic structure, having a delay 136, two optical filters 134 and 138, and another optical splitter 140. The MZI basic structure includes a first optical splitter 132, having two input terminals 130 and two output terminals. Basically, only one of the input terminals 130 is needed for actually Inputting a sequence of signals with different wavelengths. The input optical signal is split into two signals to the two output terminals. The two output terminals are then coupled to two optical routes, namely a first optical route and a second optical route A first optical filter 134 having a transmission coefficient $\rho_1$ is coupled on the first optical route. A second optical filter 138 having a transmission coefficient $\rho_2$ and a delay 136 are coupled on the second optical route. Then, the two optical routes are coupled to a second optical splitter 140 at two, input terminals. The second optical splitter 140 has two output terminals to alternatively output the input signals according to the wavelengths, so that an interleaver is achieved. Were, in order to have the interleaving function, the transmission coefficients $\rho_1$ and $\rho_2$ of the filters 134 and 138 can be properly adjusted to filter the inputting signals at wavelengths. The transmission coefficients $\rho_1$ and $\rho_2$ are determined by satisfying a desired quantity of effective group delay ratio T, defined as $$\frac{1-\rho_1}{1+\rho_1} - \frac{1-\rho_2}{1+\rho_2}.$$

The signals at the two optical routes are combined in the optical splitter 140, phenomenon of signal enhancement and suppression occurred on the two optical routes. As a result the two optical routes are in different responses to the signals, resulting in the interleaving function at the two output terminal.

Figure 4:
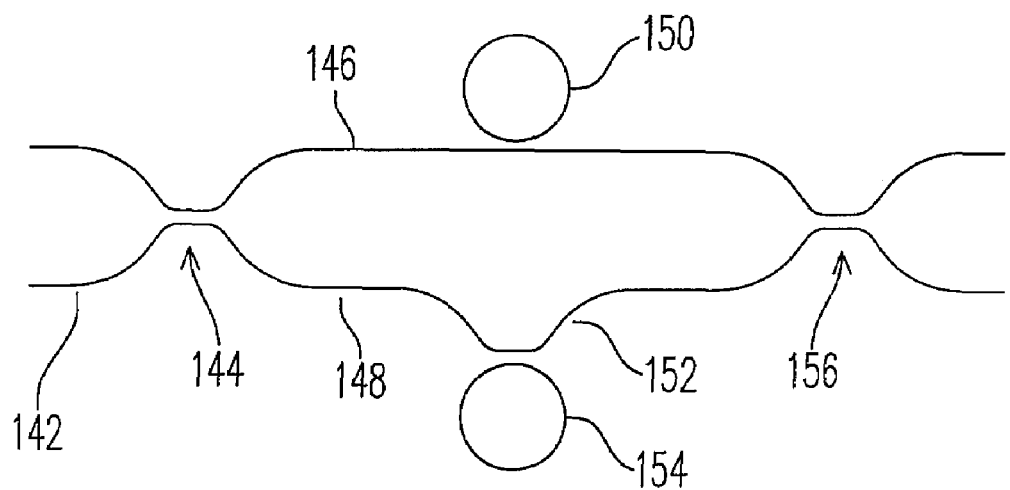
FIG. 4 is a drawing, schematically illustrating an optical structure of a wide passband interleaver, according to an embodiment of the present invention.

FIG. 4 is a drawing, schematically illustrating an optical structure of a wide passband interleaver, according to an embodiment of the present invention. In FIG. 4. the optical routes can be, for example, formed by optical fiber or optical waveguide. The optical splitters 132 and 140 of FIG. 3 can be, for example, directional coupler (DC), Y-branch device, or multi-mode interference. In the embodiment, the directional couplers 144 and 156 are taken as the example. The directional coupler has, for example, the splitting power of 3 dB. This means that one input signal at one of the input terminals 142 is to be equally divided into the two signals at the two output terminals on the optical routes 146 and 148. The filters 134 and 138 of FIG. 3 can be, for example, an all-pass filter, such as ring resonant filters 150 and 154. The ring resonator filters 150 and 154, and the delay 152 can particularly cause an optical resonant to the signals with particular wavelengths, if under a working voltage.

Figure 5:
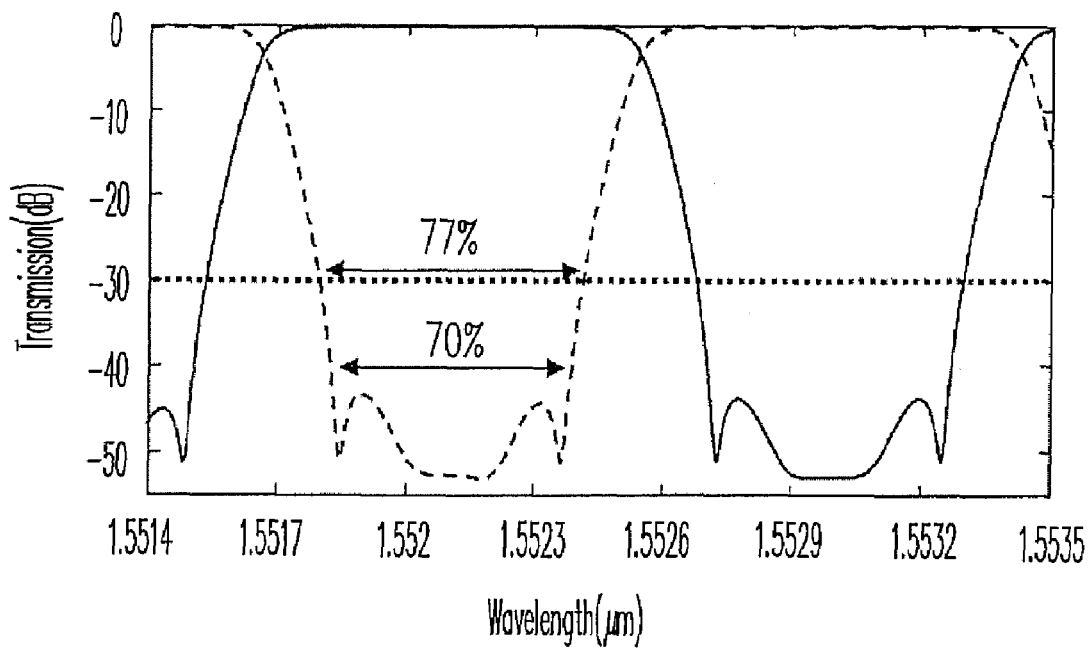
FIGS. 5-7 are drawings, schematically illustrating the performance of the interleaver, according to the embodiment of the present invention.
Figure 6:
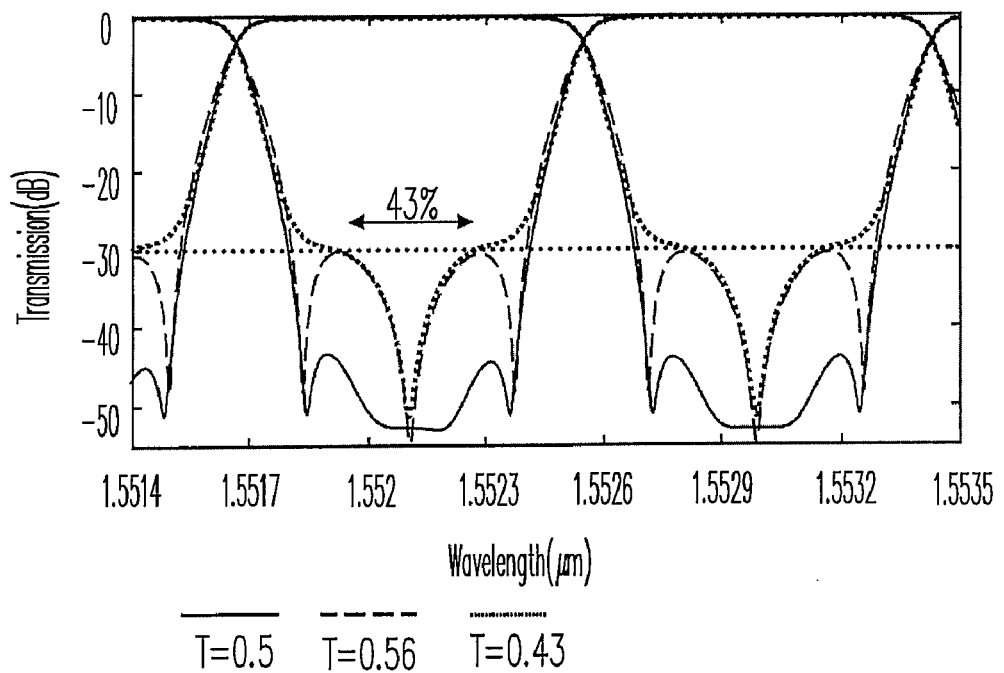
Figure 7:
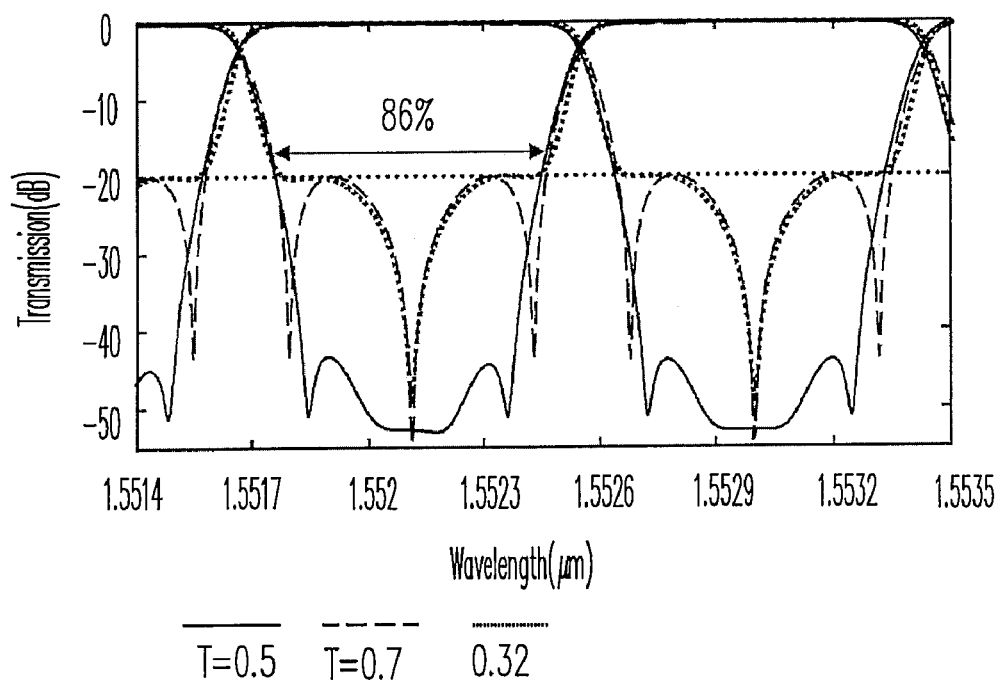

In the embodiments, each optical route is implemented with one optical filter as the example. In this situation, the effective group delay ratio $$\frac{1-\rho_1}{1+\rho_1} - \frac{1-\rho_2}{1+\rho_2}$$

is the essential factor to design the filters, based on the theoretical derivation. One desired quantity of T can allow some combination for determining the transmission coefficients $\rho_1$ and $\rho_2$ of the filters. FIGS. 5-7 are drawings, schematically illustrating the performance of the interleaver, according to the embodiment of the present invention. In FIG. 5, taking T=0.5 as the example, solid line is the signal output in transmission efficiency (dB) at one of the output terminals, with respect to the wavelengths while the dashed line represent the signal output in transmission efficiency (dB) at another one of the output terminals. The two signals are the same but with. constant shift in wavelength, If the signal is operated at the level of 30 dB crosstalk, then the effective passband ratio is about 77% when the central wavelength is set at 1.553 microns with the frequency gap about 100 GHz. In addition, the effective passband ratio at 40 dB crosstalk is still having 70%. In comparing wit the conventional interleaver with 43% of effective passband ratio, the present invention can significantly increase the effective passband ratio.

For the further study on the effects due to change of the quantity T, FIG. 6 shows results. In FIG. 6, if T is varied from 0.5 up to 0.56 or down to 0.43, the effective passband ratio may still remain at 43%. Again, if the signal is operated at 20 dB crosstalk, the results are shown in FIG. 7. In FIG. 7, for the condition of T=0.5, the effective passband ratio for the passband can achieve 86% at 20 dB crosstalk. If T is varied from 0.5 up to 0.7 or down to 0.32, the effective passband ratio can still remain large. This further indicates that the present invention can significantly improve the passband. A further investigation on the uniformity of the performance in each channel, the results (not shown in drawings) indicates that each of the wavelength channels has about the same response performance.

It should be noted that the under the same principle, the number of the filters is not limited to two in the foregoing examples. Actually, more filters can be coupled to the first optical route and the second optical route. A general definition of the effective group delay ratio T can be $$T = \sum_i S_i \frac{1-\rho_i}{1+\rho_i},$$

where i is the sequence index of the filters in a range of equal to or greater than 2, $S_i$ is +1 or −1, depending on which optical route being coupled. For example, $S_i$ is +1 for those filters coupled to the first optical route while $S_i$ is −1 for those filters coupled to the second optical route, depending on actual calculation. In other words, the filters may even be just coupled to one optical route in a specific arrangement. There is no specific limitation in coupling.

The present invention, the optical route is implemented with the filters, and the filters have the transmission coefficients $\rho_i$, respectively. The transmission coefficients $\rho_i$ can be determined by satisfying the effective group delay ratio $$T = \sum_i S_i \frac{1-\rho_i}{1+\rho_i},$$

wherein T is a quantity within a desired range. As a result, the passband can be effectively improved.

In addition to the foregoing embodiments, the optical filters can be, for example, the all-pass filters, such as the ring resonant filters. The optical splitter can include, for example, directional coupler, Y-branch device, or multi-mode interference. The quantity T can be, for example, in a range between 0.43 and 0.56 when an operation at 30 dB crosstalk, or in a range between 0.32 and 0.7 when an operation at 20 dB crosstalk. However, preferably, the quantity T can be about 0.5.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A wide passband optical interleaver, comprising:
   a first optical splitter, having a first output terminal and a second output terminal for just adapting two optical routes;
   a first optical route of the two optical routes, coupled to the first output terminal;
   a first optical filter having a transmission coefficient $\rho_1$ coupled on the first optical route;
   a second optical route of the two optical routes, coupled to the second output terminal;
   a second optical filter having a transmission coefficient $\rho_2$ and a delay, coupled on the second optical route; and
   a second optical splitter, having two input terminals for receiving the first optical route and the second optical routes,
   wherein the transmission coefficients $\rho_1$ and $\rho_2$ are determined by satisfying a desired quantity of effective group delay ratio T, defined as $$T = \frac{1-\rho_1}{1+\rho_1} - \frac{1-\rho_2}{1+\rho_2}.$$

wherein the quantity T is in a range between 0.43 and 0.56 when an operation at 30 dB crosstalk or the quantity T is in a range between 0.32 and 0.7 when an operation at 20 dB crosstalk.

2. The wide passband optical interleaver of claim 1, wherein the first optical filter and the second optical filter are all-pass filter.

3. The wide passband optical interleaver of claim 2, wherein the first optical filter and the second optical filter are ring resonant filters.

4. The wide passband optical interleaver of claim 1, wherein the optical splitter includes directional coupler, Y-branch device, or multi-mode interference.

5. The wide passband optical interleaver of claim 1, wherein the quantity T is about 0.5.

6. A wide passband optical interleaver, comprising:
   a first optical splitter, having a first output terminal and a second output terminal for just adapting two optical routes;
   a first optical route of the two optical routes, coupled to the first output terminal;
   a second optical route of the two optical routes, coupled to the second output terminal;
   a delay, coupled on the second optical route;
   a second optical splitter, having two input terminals for receiving the first optical route and the second optical route; and
   a plurality of optical filters respectively having transmission coefficients $\rho_i$ coupled to the first optical route and the second optical route,
   wherein the transmission coefficients $\rho_i$ are determined by satisfying a desired quantity of effective group delay ratio T, defined as $$T = \sum_i S_i \frac{1-\rho_1}{1+\rho_i},$$

where $S_i$ is +1 or −1, and i is integer in a range of larger than or equal to 2,
   wherein the quantity T is in a range between 0.43 and 0.56 when an operation at 30 dB crosstalk or the quantity T is in a range between 0.32 and 0.7 when an operation at 20 dB crosstalk.

7. The wide passband optical interleaver of claim 6, wherein the first optical filter and the second optical filter are all-pass filter.

8. The wide passband optical interleaver of claim 7, wherein the first optical filter and the second optical filter are ring resonant filters.

9. The wide passband optical interleaver of claim 6, wherein the optical splitter includes directional coupler, Y-branch device, or multi-mode interference.

10. The wide passband optical interleaver of claim 6, wherein the quantity T is about 0.5.

* * * * *